United States Patent
Hottinen et al.

(10) Patent No.: US 7,751,423 B2
(45) Date of Patent: Jul. 6, 2010

(54) SCHEDULER

(75) Inventors: Ari Hottinen, Espoo (FI); Tiina Heikkinen, Kirkkonummi (FI); Themistoclis Karageorgos, Lamia (GR); Alex Yao, Shanghai (CN)

(73) Assignee: Nokia Corporation, Espoo (FI)

( * ) Notice: Subject to any disclaimer, the term of this patent is extended or adjusted under 35 U.S.C. 154(b) by 805 days.

(21) Appl. No.: 11/221,786

(22) Filed: Sep. 9, 2005

(65) Prior Publication Data
US 2006/0056340 A1 Mar. 16, 2006

(30) Foreign Application Priority Data
Sep. 10, 2004 (GB) ................... 0420164.6

(51) Int. Cl.
*H04J 3/16* (2006.01)
(52) U.S. Cl. ...................... 370/437; 370/436
(58) Field of Classification Search ................. 370/330, 370/332, 335–338, 342, 347, 436, 437, 478
See application file for complete search history.

(56) References Cited

U.S. PATENT DOCUMENTS

| | | | | |
|---|---|---|---|---|
| 6,377,809 B1 * | 4/2002 | Rezaiifar et al. | ............ | 455/455 |
| 6,393,276 B1 * | 5/2002 | Vanghi | ..................... | 455/422.1 |
| 6,542,742 B2 * | 4/2003 | Schramm et al. | ............ | 455/436 |
| 6,754,169 B2 * | 6/2004 | Baum et al. | .................. | 370/204 |
| 6,956,835 B2 * | 10/2005 | Tong et al. | ................... | 370/330 |
| 2002/0183066 A1 | 12/2002 | Pankaj | | |
| 2003/0101274 A1 | 5/2003 | Yi et al. | | |

FOREIGN PATENT DOCUMENTS

WO  WO 01/54335 A1  7/2001

* cited by examiner

*Primary Examiner*—Jason E Mattis
*Assistant Examiner*—Dady Chery
(74) *Attorney, Agent, or Firm*—Squire, Sanders & Dempsey, LLP

(57) ABSTRACT

A scheduler in a communication network comprising a communication channel which is shared by a plurality of user nodes, the communication channel having a succession of slots. The scheduler has a quality unit for receiving an indication of the quality of the communication channel for each user node. A delay unit for receiving a predetermined delay factor for each of at least some of the user nodes, the delay factor representing a level of tolerance to a time delay. A selection unit connected to the quality and delay units and being arranged to determine, for each slot, which of the user nodes is to use that slot based on the channel quality indication and the delay factors.

21 Claims, 4 Drawing Sheets

SCHEDULER

The present invention relates to a scheduler for scheduling data transmissions in a communication network and, in particular but not exclusively, wherein the communication channel is shared by a plurality of user nodes and the scheduler selects which user node uses the channel for each time slot.

In wireless communication networks it is particularly desirable to manage resources carefully especially since channel bandwidth is at a premium. Efficient management of available resources allows one to provide a desirable quality of service (QOS). Different telecommunication services may require different bandwidth characteristics to be supported. This has led to the emergence of radio resource management (RRM) in wireless communication networks. RRM is concerned with managing the available resources of the network in the most effective way. These resources might include physical resources (for example throughput, power control, load control, etc.), link resources (packet scheduling, admission control, etc.) and the wireless communication system as a whole.

There are many different communication protocols and standards in use today, for example wideband code division multiple access (WCDMA), which encourage multi-user diversity by frequency hopping and reuse, which allows for optimum use of the bandwidth of a cell coverage area which transmits to multiple user nodes (i.e. mobile stations). A common method of optimising the number of users transmitting on a common channel is to divide the communication channel into timeslots, which are the fractions of time allocated to a particular mobile station for transmitting over the shared communication channel. Therefore, some sort of scheduling mechanism is an essential component in these types of systems for scheduling, which of the user nodes will be allowed to transmit data in each timeslot.

Thus, broadly speaking a scheduling mechanism is required to allocate which user nodes communicate for each timeslot depending on the requirements of the system as a whole.

Channel-aware scheduling is a primary method for obtaining high throughput in modern networks. As its name suggests, this type of scheduling is based on monitoring the channel for each of the user nodes of a communication network and scheduling the appropriate user node with a view to obtaining a high overall throughput. A particular example of this scheduling is known as proportional fair scheduling (PFS) wherein the user with highest ratio of instantaneous transmission rate to its average transmission rate is scheduled for that timeslot (otherwise known as "opportunistic scheduling").

The paper by S. Kulkarni and C. Rosenberg with the title "Opportunistic Scheduling Policies for Wireless Systems Short Term Fairness Constraint" published in the Globecom Proceedings of 2003 describes an opportunistic scheduling mechanism for wireless systems having time varying channel conditions. The system describes that wireless channels have time varying characteristics wherein different user nodes have different channel qualities at the same time because of effects such as user shadowing, path losses due to changing environments and user mobility. These variations of the channel conditions can be exploited to increase the system throughput.

As explained the basic idea behind opportunistic scheduling is to schedule a user having the best channel conditions at a given time. The document acknowledged above proposes PFS scheduling using a short-term time window on which the fairness is guaranteed. A heuristic approach is adopted which combines long-term fairness with book-keeping.

The problem with known methods which use the time-window approach is that a counter needs to keep track of the number of timeslots each user has been allocated in a frame (i.e. a short term time window). A disadvantage of this is that memory is required to keep count of the timeslots allocated to each user (i.e. also known as book-keeping).

The applicants have realised that in wireless multimedia networks different services are associated with different delay requirements. It is therefore important to provide control means for taking into account services having different delays.

It is an object of an embodiment of the present invention to overcome these drawbacks and to provide a system, which is able to take into account different user-specific delays.

According to one aspect of the present invention there is provided a scheduler in a communication network comprising a communication channel which is shared by a plurality of user nodes, the communication channel having a succession of slots, the scheduler comprising: a quality unit for receiving an indication of the quality of the communication channel for each user node; a delay unit for receiving a predetermined delay factor for each of at least some of the user nodes, the delay factor representing a level of tolerance to a time delay; and a selection unit connected to the quality and delay units and being arranged to determine, for each slot, which of the user nodes is to use that slot based on the channel quality indication and the delay factors.

According to a further aspect of the present invention there is provided a method for scheduling access to a slot of a communication channel which is shared by a plurality of user nodes, the method comprising: receiving a first set of quality values each representing a quality of the communication channel for each of the user nodes; receiving a second set of predetermined delay factors each representing a tolerance to a time delay of at least some of the user nodes; selectively determining which of the user nodes is to be granted access to the slot based on a combination of the quality values and the delay factors.

For a better understanding of the present invention and to show how the same may be carried into effect, reference is now made by way of example to the following drawings, in which.

Figure 1:
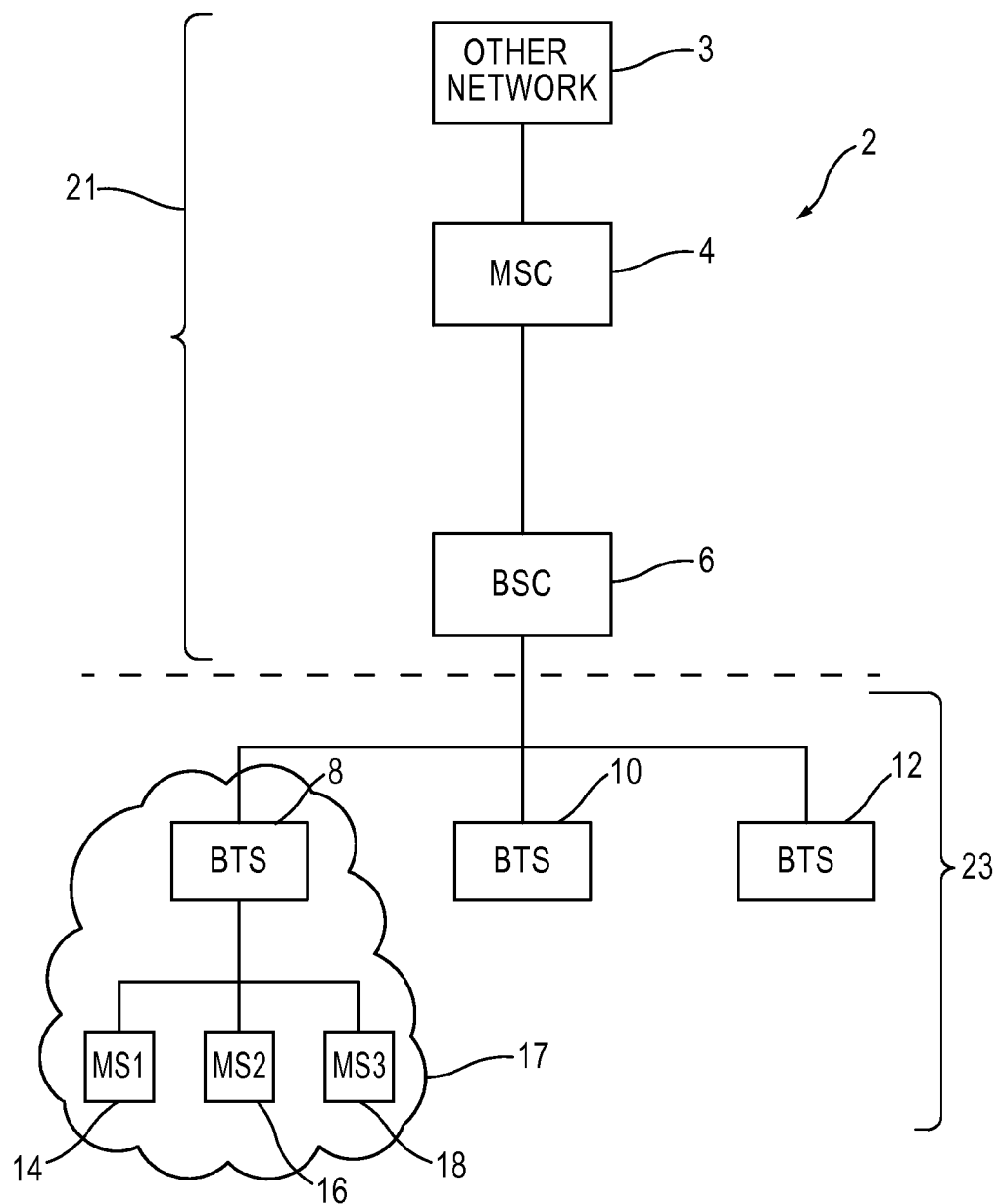
FIG. 1 shows the structure of a wireless communication network in which embodiments of the present application are able to operate.

FIG. 1 shows the structure of a wireless communication network in which embodiments of the present application are able to operate. The wireless communication network can for example be a public land mobile network (PLMN) 2 which comprises a core network (CN) part 21 and a radio access network (RAN) part 23. The core network for example comprises a base station controller (BSC) 6 and a main switching centre (MSC) 4, which can be connectable to other communication networks 3. The RAN 23 comprises at least one base transceiver station (BTS) 8 which communicates with at least one user node (MS1) 14. It will be appreciated that for any given network there may be more than one of these respective elements. Indeed, the present application is particularly concerned with the RAN part of the network 23 wherein a BTS 8 transmits data to a plurality of user nodes, i.e. MS1 14, MS2 16 and MS3 18 for a single coverage area (or cell) 17.

There are various protocols for conveying data between the BTS 8 and the associated mobile stations 14, 16, 18 in the coverage area 17. These could for example include at least one of, and more probably, a combination of the following: time multiplexing (TDMA), frequency multiplexing (FDMA) and spreading codes with frequency hopping (for example, CDMA, WCDMA, etc.). The embodiments of the present invention find particular application in cdma 2000 networks (for example the 1×EV-DO and 1×EV-DV) or WCDMA networks (for example HSDPA) and in 4G and other non-cellular networks (for example in a wireless LAN).

Figure 2:
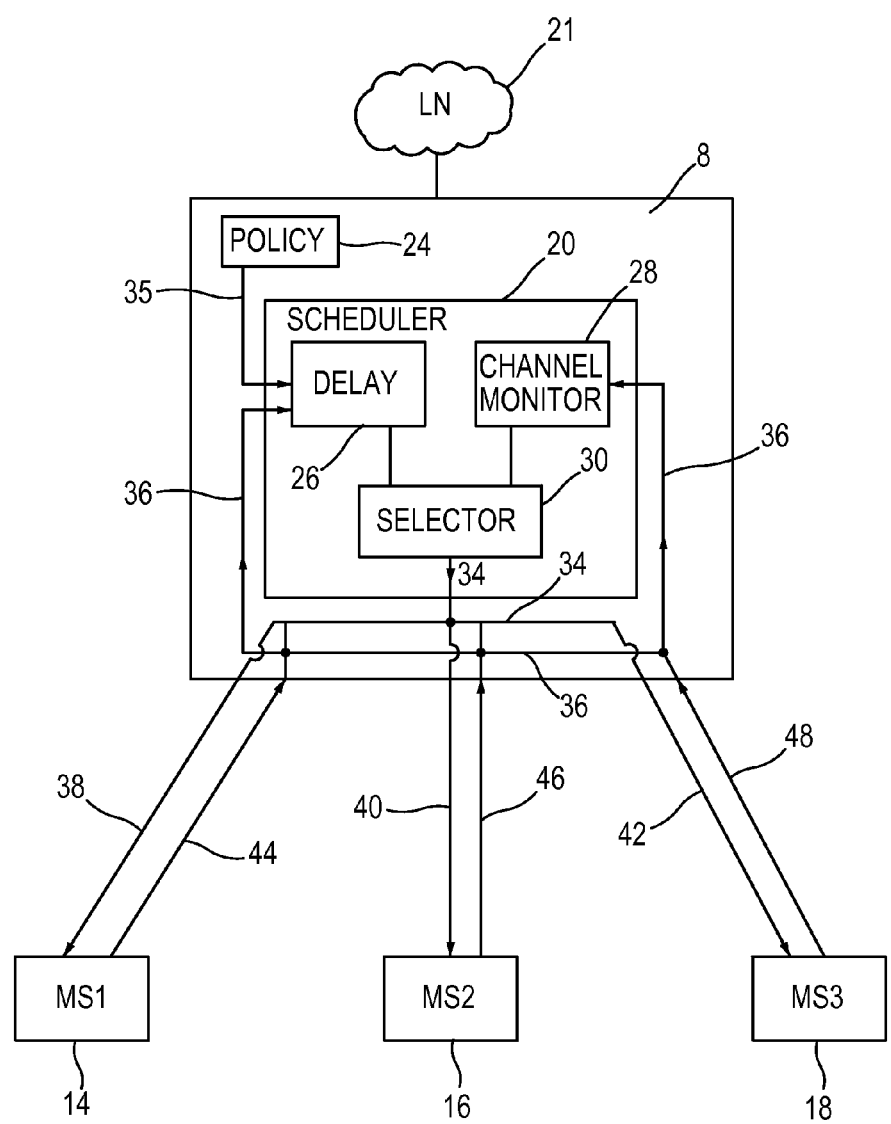
FIG. 2 shows an embodiment of the present invention.

However, whatever transmission protocol is ultimately used, some sort of scheduling mechanism is required in order to achieve optimal RRM. FIG. 2 shows a scheduler 20 which exists in the BTS 8, and which is responsible for selecting one of the mobile stations 14, 16 or 18 to communicate with a particular point in time. This will be described in more detail later, however a basic understanding of this can be achieved by referring to FIG. 3.

Figure 3:
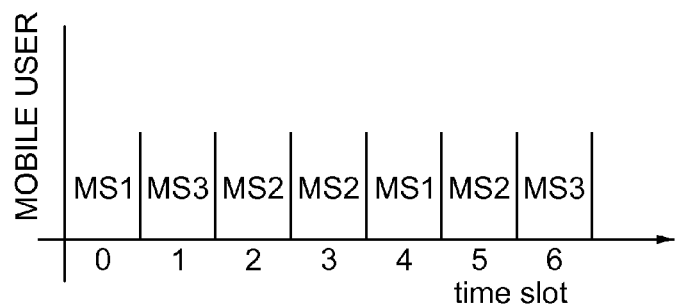
FIG. 3 shows an example of scheduling time slots in accordance with embodiments of the present inventions.

FIG. 3 shows a communication channel, for example when used to convey data in the coverage area 17. The channel can be thought of as comprising a succession of timeslots (indicated as 0, 1, 2, 3, 4, 5, 6, etc. on the x axis of FIG. 3). At the start of each timeslot, the scheduler 20 in the BTS 8 is used to select which of the mobile nodes is to be scheduled for that particular time slot. That is, for timeslot 0 the scheduler 20 decides to schedule MS1 14, whereas at the next timeslot (i.e. timeslot 1) the scheduler decides to schedule MS3 18. In other words, all of the mobile stations in a particular coverage area could for example be competing to use the channel bandwidth to transfer data.

It should be appreciated that in each timeslot, data can either be transmitted from the BTS 8 to the user nodes 14, 16 or 18 (i.e. in the downlink direction) or alternatively data can be transmitted from the user nodes 14, 16 or 18 to the BTS 8 (i.e. in an uplink direction). However, embodiments of the present application will now be described wherein data is to be transmitted in the downlink direction 38, 40, 42 over the respective time slots of a communication channel (cell 17).

FIG. 2 shows that the scheduler 20 comprises a delay unit 26 and a channel monitoring unit 28 which are connected to a selection unit 30. The BTS 8 comprises a policy unit 24, which may in alternative embodiment reside in the scheduler 20 itself or somewhere else in the CN 21. The selection unit 30 has an output 34 used to select one of the user nodes 14, 16, 18 that the BTS will transmit data to at the start of each timeslot. Data is then transmitted to the selected user node 14, 16 or 18 over respective downlink channels 38, 40 or 42.

The channel quality of the downlink channels 38, 40 and 42 can be monitored by the respective user nodes 14, 16 or 18, and an indication of that channel quality can be fed back to the scheduler unit via respective uplink channels 44, 46 or 48. It should be appreciated that in alternative embodiments the uplink channel is not required and the quality of the downlink channel can be supplied to the scheduler 20 in some other known way.

Embodiments of the present invention are particularly concerned with services which are sensitive to time delays when data is transmitted. Thus, it is assumed that at least some of the user nodes 14, 16, 18 in a coverage area 17 are delay-intolerable. Embodiments of the invention take this delay into account by assigning delay penalties associated with the particular user node. This delay penalty provides an indication to the scheduler as to how delay intolerable the respective user node is. These delay penalties are represented as delay factors $b_i$ wherein i indicates the relevant user node. That is, the delay factor is in the range from 0 to 1, wherein for example the higher the penalty factor, the more tolerant a particular mobile node is to time delays (a user node having a delay factor $b_i=0.95$ is far more tolerant to time delays than a user node having the delay factor $b_i=0.30$). A delay factor of the maximum of 1 (i.e. $b_i=1$) indicates a best-effort user node which is not sensitive to time delays at all. That is, with best-effort nodes, it will be appreciated that there is no time limit for a particular packet to reach a particular node.

Although the user nodes shown in the embodiment of FIG. 2 take the form of MSs 14, 16, 18, they could just as easily be replaced with computer nodes for example in a wireless local area network (LAN). In such a case, data packets are scheduled for transmission to a particular node of a wireless LAN for a particular timeslot. Thus, the present invention is not restricted to cellular communications.

FIG. 2 shows that the delay unit 26 is able to receive a first set of inputs 35 from the policy unit 24 or a second set of inputs 36 from the user nodes 14, 16 or 18. Both of these sets of inputs indicate a predetermined penalty factor for a particular user node (i.e. supporting a particular service). That is, in a preferred embodiment the user node itself has functionality for assigning a particular penalty factor to the service which it supports and transmits this information to the delay unit 26 of the scheduler 20 via the respective uplink channels 44, 46 or 48. However, in an alternative embodiment the penalty factors are in fact supplied by a policy unit, which for example could reside in the BTS 8 (as shown in FIG. 2) or somewhere else in the network.

The downlink channel conditions 38, 40, 42 are variable and for any timeslot the channel quality may be affected because of user shadowing, fading and user mobility. Thus, in the embodiment each of the user nodes monitors the downlink channels 38, 40 and 42 and supplies an indication of the quality of these channels for any timeslot to the channel monitor 28 in the scheduler 20. An indication of the channel quality can take on many forms, one of which being the instantaneous transmission rate data. The channel monitor has functionality for calculating the average transmission rate and then determining a ratio of the instantaneous transmission rate to the average transmission rate associated with each user node 14, 16 or 18. These respective ratios are then sent to a selector 30 which is able to determine which of the ratios (of instantaneous transmission rate to average transmission rate for each MS) is the highest. The user node having the highest ratio will be scheduled for that timeslot. This is known as proportional fair scheduling (PFS).

Embodiments of the present invention seek to adapt this scheduling mechanism to also take into account the delay intolerance of the respective user nodes. Thus, the embodiment of FIG. 2 shows that the selector 30 determines which of the mobile stations to select for a particular timeslot depending on both the monitored channel qualities 28 and the predetermined delay factors.

In particular embodiments of the present invention are concerned with reducing the so-called starvation period associated with delay-intolerant user nodes. In particular, a maximum starvation period can be set up so as to limit the maximum number of timeslots between successive transmissions for a particular delay-intolerant user node. That is, the scheduling example of FIG. 3 would tend to indicate that MS2 is highly delay-intolerant and therefore transmits in timeslots 2, 3 and 5 as compared to MS3 which is more tolerant to delay and transmits in timeslots 1 and 6. Thus, the maximum starvation period for MS2 is only a single timeslot (i.e. timeslot 4 where MS1 transmitted between timeslots 3 and 5 used by MS2). In contrast, MS3 has a longer starvation period of four timeslots in that MS3 first transmits a timeslot 1 and its next transmission is four timeslots later, as timeslot 6.

Thus, embodiments of the present invention are concerned with a scheduling criteria which is based on a "virtual SNR", which means assigning a relatively high priority to a user with a low penalty factor (representing a highly delay-intolerable user) while still taking channel information into account.

In an embodiment of the present invention the delay factor is time-varying so that each timeslot that a user node is not scheduled, will result in its delay factor being increased. This has the ultimate effect of limiting the maximum starvation period for a particularly delay-intolerable user. That is, the delay factor is also a function of time and can be represented as $b_{it}$.

If at a timeslot t, the user node i has a particular $b_i$ value but is not scheduled, then the $b_i$ value is modified by some factor, for example $b_i^2$ for the next time slot. Again, for the next timeslot t+1 if MS i is again not scheduled then the delay factor is further modified, for example $b_i^3$. Thus, it can be seen that for each successive timeslot that a delay-intolerable user node is not scheduled, the penalty factor associated with it is decreased (which indicates to the scheduler that increasing priority should be given to that particular MS). That is a $b_i=0.95$ at timeslot t, will be $b_i^2=0.90$ at timeslot t+1 and so on until eventually a limit is reached wherein the scheduler can no longer ignore the particular user node. In one embodiment the delay factor can be so low (i.e. highly delay-intolerant) that the scheduler will schedule that user node irrespective of how poor its channel conditions are. An advantage of this is that a maximum starvation period can be set up for delay-intolerable user nodes, which is independent of the channel quality.

It should be appreciated that in an alternative embodiment, a limit can be set as to the minimum acceptable channel quality for which a particular user node should be scheduled. That is, in some cases it would be undesirable to schedule a particular user node no matter how delay-intolerant it is, if the channel quality to that user node is particularly poor.

Whereas traditional PFS scheduling is primarily concerned with optimising the throughput, the delay penalty factor model of the embodiments of the present invention are based on dynamic optimisation of the delay-throughput trade off. The penalty model effectively limits the maximum starvation period.

Appendix A shows how a scheduling criteria for an embodiment of the present invention can be derived from first principles as indicated by Equation (10). That is, a scheduling criteria is specified in terms of channel threshold values, wherein $\alpha_{it}$ is the actually realised threshold value for a particular user node i at a particular time, and $\overline{\alpha}_{it}$ is the optimal threshold value of user node i at a value t. Equation 10 can also be reduced to that shown in Equation (11) wherein if $\alpha_{it}$ is the instantaneous transmission rate for the user node i at a time t, and the threshold value $\overline{\alpha}_{it}$ is the average transmission rate of the user node i at time t, then Equation (11) represents PFS scheduling adapted to take into account the penalty factors of delay-intolerant user nodes.

Equation (12) shows derivation of the threshold value $\overline{\alpha}_i$ in a Rayleigh fading channel which is stationary (i.e. without time correlation). However, a time-correlated channel with time-varying penalties is approximated by Equation (13). Equation (13) indicates that the more delay-tolerant the user node is, the higher the $b_i$ penalty factor, and therefore the higher the threshold value for $\overline{\alpha}_{it}$ that needs to be met by the realised late $\alpha_{it}$. Thus, Equation (13) shows that the threshold values are dependent on the penalty delays which vary over time.

In summary, therefore, the scheduling criteria is proposed wherein for a particular time slot t, the user k shows a maximum ratio $\alpha_{kt}/\overline{\alpha}_{kt}$ is scheduled to transmit at that timeslot. The threshold value ($\overline{\alpha}_i$ or $\overline{\alpha}_{it}$) can be determined either using equation (12) or equation (13) in appendix A. Thus, the threshold values of embodiments of the present invention take into account both channel quality and penalty factors which vary over time.

It should be appreciated that although the scheduling criteria of equations (10) and (11) are derived to schedule the user node with the maximum virtual SNR (or threshold value). However any criteria may be used (not necessarily the maximum), provided that the virtual SNR takes into account delay penalties.

Also, it should be appreciated that the delay penalties can by dynamical modified to take into account the user nodes status. For example, if a given user node has no data to send, the user-specific delay penalty can be altered. Thus if there is no data available to be sent to a particular user node, irrespective of how delay-intolerant the service it supports is, the delay penalty for that user node can be modified, i.e. $b_i=1$. In this way, the delay penalty can take into account the required throughput (or transmission time) for data that exists in a buffer ready for transmission. For example, when the buffer (in the transmitter such as the BTS 8) is filling up, overflow of this buffer can be prevented by decreasing the penalty factor $b_i$ (which in effect increases the delay intolerance of the corresponding user node and data throughput through the buffer is increased. Thus, the delay-intolerance can be controlled in various ways, and depends on a number of issues, for example: throughput (experienced), implementation complexity (buffer size), etc. Also the receiver may signal to the transmitter when a delay factor has changed to indicate that buffers in the receiver unit are filling up or vice versa.

Embodiments of the present invention find particular application in so-called "ad hoc" networks where each node is responsible for forwarding a received packet through means of its own scheduling criteria. That is, each node locally decides in a random fashion (for example using game theory) whether the scheduling criteria is satisfied.

Figure 5:
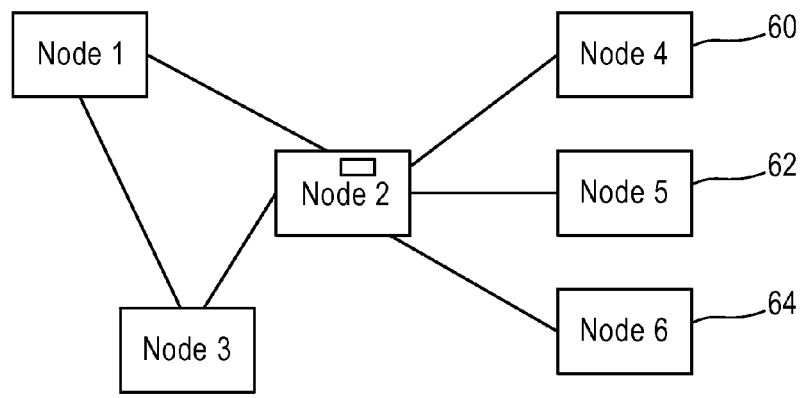
FIG. 5 shows an alternative embodiment of the present invention in an ad hoc network.

FIG. 5 shows an example of an ad hoc network wherein a packet is forwarded from node1 to node2, and node2 decides to send a packet downstream for a particular timeslot to one of: node4, node5 or node6. If only node4 and node5 meet the scheduling criteria for ad hoc networks, i.e. $\alpha_{kt} - \overline{\alpha}_{kt} \geq 0$, then node 6 is automatically not scheduled and a random choice (based on game theory) is made between node4 and node5.

Therefore, this alternative embodiment of an ad hoc network corresponds to distributed delay-penalised scheduling, rather than centralised delay-penalised scheduling as was the case with the PLMN having a centralised scheduler 20 within the BTS 8. Instead, in an ad hoc network each node is capable of random decentralised scheduling.

It should be appreciated that the ad hoc network is only one possible application for decentralised scheduling. Another is contention-based channel access, used for example in WLAN 802.11 (wireless local area network), which uses channel sensing to determine if a user node may use the channel. For this embodiment in a WLAN, in addition to channel sensing, the transmission decision (even without an ad-hoc network having multiple nodes) depends also on the delay penalties of the given user node. As an example, a user node that has not been able to access a channel in CSMA (carrier-sense multiple access), is able to send a channel reservation request (or an access request), which has either a higher transmit power or more frequently when the delay intolerance increases. Thus, the scheduling mechanism of the described embodiments can also be used also for initial access to a channel, as well as in the more general case of transferring data once the access has been granted. These embodiments may also be combined with "game theoretic" randomisation methods.

A brief summary of the game-model for distributed scheduling is as follows. Non-cooperative nodes play a scheduling game where the payoff function $r_{it}$ of node i at time t is the difference between the rate and its threshold value. The binary decision variable at t, is $x_{it}=1$ if i transmits at time t (and 0 otherwise). The nodes autonomously make their scheduling decisions based on local rate measurements and a locally defined targets (as modelled by the threshold value). It is assumed that the collision cost is infinite, i.e. whenever a node detects the channel is reserved it will retry transmission at a random time. Each node will transmit only its scheduling criterion, for example, $r_{it}=\alpha_{it}-b_{it}E(\alpha>0)$ is met. Essentially, this is an example of a simple congestion-based concept that is used particularly in non-cellular wireless systems (such as wireless LAN, blue tooth, ad hoc networks, etc.).

The decentralised embodiment of the present invention is advantageous in that it is not necessary to keep track of the penalty factors of all the user nodes. Furthermore, user-specific delay parameters directly measure the delay-tolerance of the user nodes so that these are given absolutely (but may vary over time). Further, for the decentralised embodiment the payoff function is defined locally at the node level, which does not require centralised knowledge of the delay factors.

A further advantage of embodiments of the present application is being able to dynamically determine an optimal threshold value for scheduling which takes in to account channel conditions.

It should be noted that in both embodiment of FIGS. 3 and 5, the scheduling criteria (i.e. threshold values) are a function of the channel characteristics as well as delay penalties (which can be time-varying).

Figure 4:
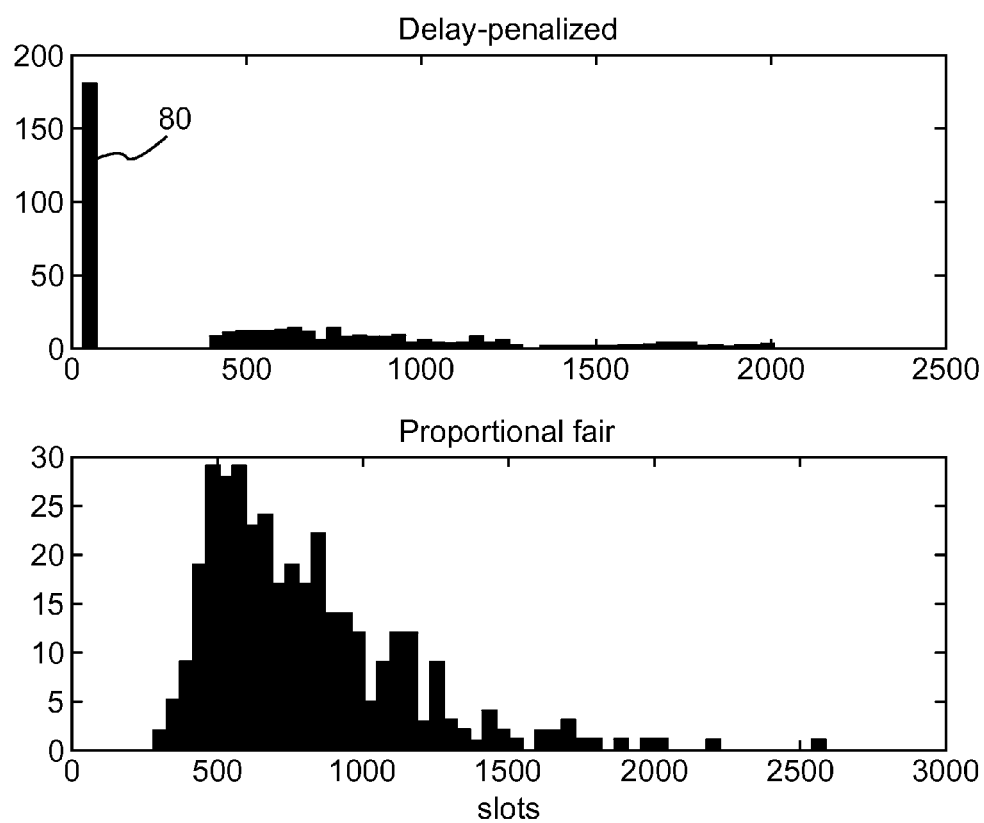
FIG. 4 shows an the results of an exemplary implementation of the invention using a delay-penalty system as compared to a PFS system.

FIG. 4 shows an exemplary implementation of scheduling wherein the top graph represents scheduling with delay differentiation (i.e. delay penalties) and the bottom diagram represents standard PFS scheduling.

FIG. 4 shows in the upper graph of FIG. 4 the results of a delay-scheduling mechanism of the described embodiments (the upper graph of FIG. 4). The simulation was considered for a Rayleigh fading channel with expected values of the gain coefficients uniformly distributed between 1 and 10. Noise power I set at 0.1.Users I—1, . . . , 6 have a delay factor $b_i=0.95$ whereas the rest of the nodes are best effort ($b_i=1$). With 12 users in a two-class system (i.e. two classes of delay differentiated nodes), the delay distributed is depicted in FIG. 1 (30 runs each with 5000 time slots). In the upper diagram, the left-most bar 80 indicates the number of delay-intolerant users. It can be seen that the proposed scheduling mechanism gives a type bound for the maximum delay (i.e. starvation period) for the delay-intolerant services. That is, the maximum starvation window delay-intolerant users is 37 slots, whereas in contrast the PFS scheduling distribution shown in the bottom graph of FIG. 4 indicates the starvation period is much larger in PFS (i.e. 827 slots).

Thus, in comparison to PFS scheduling (see lower figure), the delay-penalised scheduling of the upper figure is shown to improve the starvation period of the delay-intolerant users by several hundred timeslots. That is, the maximum starvation period using delay-penalised scheduling is 37 slots which is on average only 4.5% of that using PFS for the delay-intolerant nodes, which is 827 slots. For this exemplary implementation the throughput is slightly less than that using PCS (i.e. around 90%), but the worst starvation period is far less than with PFS. Thus a good trade-off is achieved between delay and throughput. In allowing for a good throughput through the system while still taking into account delay-intolerant services.

The calibration of the delay penalty $b_i$ can be done adaptively:
if the maximum starvation period $s_i$ of a delay-intolerant node i exceeds a threshold s[bar] then the delay penalty of $b_i$ should be decreased (to prioritise the node i and so decrease its transmission delay);
if $s_i$ falls under threshold s, then $b_i$ should be increased (i.e. to increase the overall throughput of the system).

Thus, in this way it is possible to initialise the delay-penalty parameters $b_i$ in line with desired and predetermined policy settings. Thus, consider two classes of users; best effort ($b_i=1$) and delay-intolerant ($b_i<1$) and if n denotes the number of delay-intolerant nodes, then the delay penalty $b_i$ of the delay-intolerant users with maximum tolerated starvation periods d solves;

$$b_i^{d \cdot n} \sim 0.2.$$

It should be noted that the delay penalty for the example shown in FIG. 4 equals $0.95^{31}=0.2$ (with d=37 and n= to 6). Thus, delay-penalised scheduling allows for efficient delay differentiation using different delay parameters. Users that have high delay penalities (i.e. low penalty factors $b_i$) get stringent delay bounds, whilst still making partial use of channel information in terms of multi user diversity. Users with high delay penalties (i.e. approaching 1 as is the case for best effort users) behave more like conventional PFS scheduling solutions.

It should be appreciated that a given user node need not know the delay penalties of other users when creating the "virtual SNR" on which the scheduling decision is made. Also, the delay penalties are flexible in that they can be user-specific, service-specific, or network-specific.

Although the described embodiments are concerned with relatively simple resource scheduling based on time slots of a shared communication channel, it should be appreciated that in practice the situation is typically more complex and other scheduling resources may also be available. Examples include: the number of chanellisation codes (and possibly their indices), the number of sub-carriers (and possibly their indices), the antenna resources which may include multi-input multi-output (MIMO) modulation, transmit diversity, beam, etc.

That is, in the example of FIG. 2, the BTS 8 could transmit in the cell 17 using FDMA which would in effect result in more than one communication channel being separated by different frequencies. Thus, in such a case, the scheduler is more complex since it needs to decide, for each time slot which user node to select. Therefore, in this example it is possible that more than one user may be assigned to the same or partially overlapping timeslot. Therefore it should be appreciated that other multiplexing methods may be used, for example: FDMA (frequency division multiple access), CDMA (code division multiple access), OFDM (orthogonal frequency division multiplexing), OFDMA (orthogonal frequency division multiple access), SDMA (space division multiple access), MIMO or a combination thereof.

It should be appreciated that the channel quality can be defined differently to suit different systems. Thus, whereas data transmission rate is one indication of channel quality, others can include: SNR (signal to noise ration), SINR (signal to interference plus noise ratio), achievable rate, coding and modulation parameters for achieving desired rate with given channel quality, CQI (channel quality indicator), etc. Channel quality can also be defined differently depending on different modulation and transmission systems. For example, the SNR may be derived with MIMO transmission (and/or in other channels where there is interference between different symbols) using known methods.

It should also be appreciated that whereas embodiments of the present invention are used to determine the scheduling resources, the actual transmission method for a scheduled user may or may not use the delay factor. For example the CQI can be based on true SNR, not necessarily the virtual SNR.

It should also be appreciated that power control, adaptive modulation and coding, and other schemes such as ARQ (automatic repeat request) may be used. The delay factor can be changed accordingly, for example when a data packet is erroneously received and negative acknowledgement is sent to the transmitting unit. Thus ARQ-related signalling may be used indirectly to control delay tolerance.

The invention claim is:

1. An apparatus, comprising:
   a quality unit configured to receive an indication of the quality of a communication channel for each user node of a plurality of user nodes;
   a delay unit configured to receive a predetermined delay factor for each of at least some of the user nodes, the delay factor representing a level of tolerance to a time delay; and
   a selector configured to be operably connected to the quality and delay units and being configured to determine, for each slot of a succession of slots of the communication channel, which of the user nodes is to use that slot based on the channel quality indication and the delay factors,
   wherein the indication of the channel quality is a data transmission rate, and
   wherein proportion fair scheduling is performed by selecting, for each slot, which user node has the highest ratio of an instantaneous data transmission rate to an average data transmission rate.

2. The apparatus of claim 1, wherein the delay factors vary for successive slots.

3. The apparatus of claim 2, wherein if a user node having a predetermined delay factor is not selected for a slot, its delay factor is modified to indicate for the next slot that the user node is even less tolerant to a time delay.

4. The apparatus of claim 1, wherein the ratio is modified by applying a delay factor to each of the transmission rates.

5. The apparatus of claim 1, wherein the delay factors and the indications of the quality of the communication channel are received from the user nodes.

6. The apparatus of claim 1, further comprising a policy unit configured to store the predetermined delay factors.

7. The apparatus of claim 1, wherein the slot is a time slot.

8. The apparatus of claim 1, wherein the apparatus is in a communication network, the communication network comprising another communication channel which is distinguished from the communication channel using at least one of code division multiple access, frequency division multiple access, orthogonal frequency division multiplexing, orthogonal frequency division multiple access, space divisional multiple access, multiple input multiple output or a combination thereof.

9. The apparatus of claim 1, wherein the apparatus is in a wireless communication network.

10. The apparatus of claim 1, wherein the apparatus is in an ad hoc network, and wherein a scheduler is located within each user node of the ad hoc network for performing decentralized scheduling.

11. A method, comprising:
    receiving a first set of quality values each representing a quality of communication channel for each of the user nodes of a plurality of user nodes;
    receiving a second set of predetermined delay factors each representing a tolerance to a time delay of at least some of the user nodes;
    selectively determining which of the user nodes is to be granted access to a slot of the communication channel based on a combination of the quality values and the delay factors,
    where an indication of the channel quality is a data transmission rate, and
    wherein proportional fair scheduling is performed by selecting, for each slot, which user node has the highest ratio of an instantaneous data transmission rate to an average data transmission rate.

12. The method of claim 11, wherein the delay factors vary for successive slots.

13. The method of claim 12, further comprising, modifying a delay factor of a user node to indicate for the next slot that the user node is even less tolerant to a time delay, if the user node having a predetermined delay factor is not selected for a slot.

14. The method of claim 11, further comprising modifying the ratio by applying a delay factor to each of the transmission rates.

15. The method of claim 11, wherein the receiving the first set of quality values further comprises receiving the first set of quality values from the user nodes, and wherein the receiving a second set of predetermined delay factors further comprises receiving the second set of predetermined delay factors from the user nodes.

16. The method of claim 11, further comprising storing the predetermined delay factors.

17. The method of claim 11, wherein the slot is a time slot.

18. The method of claim 11, further comprising:
    distinguishing another communication channel from the communication channel using at least one of code division multiple access, frequency division multiple access, orthogonal frequency division multiplexing, orthogonal frequency division multiple access, space divisional multiple access, multiple input multiple output or a combination thereof.

19. The method of claim 11 wherein the method is implemented in a wireless communication network.

20. The method of claim 11, wherein a scheduler is located within each user node of an ad hoc network for performing decentralised scheduling.

21. An apparatus, comprising:
    quality means for receiving an indication of the quality of a communication channel for each user node of a plurality of user nodes;
    delay means for receiving a predetermined delay factor for each of at least some of the user nodes, the delay factor representing a level of tolerance to a time delay; and
    selection means for determining, for each slot of a succession of slots of the communication channel, which of the user nodes is to use that slot based on the channel quality indication and the delay factors,
    wherein an indication of the channel is a data transmission rate, and
    where proportional fair scheduling is performed by selecting, for each slot, which user node has the highest ratio of an instantaneous data transmission rate to an average data transmission rate.

* * * * *